United States Patent
Krug et al.

(10) Patent No.: US 10,824,473 B1
(45) Date of Patent: Nov. 3, 2020

(54) CLOUD PLATFORM SERVICES IN INTEGRATED SYSTEM ENVIRONMENT

(71) Applicant: SAP SE, Walldorf (DE)

(72) Inventors: Marcus Krug, Potsdam (DE); Annika Schneider, San Francisco, CA (US); Christian Karaschewitz, Potsdam (DE); Sebastian Schlunke, Potsdam (DE); Cornelius Bock, Potsdam (DE); Christopher Wong, San Francisco, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/713,941

(22) Filed: Dec. 13, 2019

Related U.S. Application Data

(60) Provisional application No. 62/900,976, filed on Sep. 16, 2019.

(51) Int. Cl.
*H04L 29/06* (2006.01)
*H04L 29/08* (2006.01)
(Continued)

(52) U.S. Cl.
CPC ............ *G06F 9/505* (2013.01); *G06F 9/5011* (2013.01); *G06F 9/5072* (2013.01);
(Continued)

(58) Field of Classification Search
USPC ........................................ 709/226, 219, 224
See application file for complete search history.

(56) References Cited

U.S. PATENT DOCUMENTS 9,020,848 B1 * 4/2015 Ridge .................. G06Q 40/125
705/32
9,720,707 B1 * 8/2017 Shook ..................... G06F 9/451
(Continued)

OTHER PUBLICATIONS

AmericanBanker.com[Online], "A payday lender in disguise? New York investigates the Earnin app" Available on or before Apr. 3, 2019 via Internet Archieve : Wayback Machine URL <https://web.archive.org/web/20190531144127/https://www.americanbanker.com/news/a-payday-lender-in-disguise-new-york-investigates-the-earnin-app>, retrieved on May 31, 2019, URL <https://www.americanbanker.com/news/a-payday-lender-in-disguise-new-york-investigates-the-earnin-app>, 5 pages.
(Continued)

*Primary Examiner* — Jude Jean Gilles
(74) *Attorney, Agent, or Firm* — Fish & Richardson P.C.

(57) ABSTRACT

The present disclosure relates to computer-implemented methods, software, and systems for determining an acceptable amount for allocation to a requestor. A request from a requestor is received at a cloud platform service. The cloud platform service is integrated with a plurality of systems storing data for employees of an enterprise. A real time estimation of an acceptable amount to be allocated to the requestor is provided by the cloud platform service. Providing the real time estimate comprises identifying the requestor at an employee record stored at the plurality of systems. Data from at least one of the plurality of systems is acquired in relation to the requestor. The data defines performed work tasks, compensation and eligible benefits that are to be monetized. An acceptable amount is determined by evaluating the acquired data according to a predictive model at the cloud platform service and according to processing rules.

20 Claims, 5 Drawing Sheets

(51) Int. Cl.
    *G06F 9/50*     (2006.01)
    *G06N 20/00*     (2019.01)
    *G06Q 20/20*     (2012.01)

(52) U.S. Cl.
    CPC ........... *G06F 9/5077* (2013.01); *G06N 20/00* (2019.01); *H04L 67/1025* (2013.01); *H04L 67/306* (2013.01); *H04L 67/32* (2013.01)

(56) References Cited

U.S. PATENT DOCUMENTS

| | | | | |
|---|---|---|---|---|
| 2014/0025959 | A1* | 1/2014 | Dittrich | H04L 9/0656 713/189 |
| 2014/0123296 | A1* | 5/2014 | Subramanian | H04L 67/10 726/26 |
| 2015/0254577 | A1* | 9/2015 | Sullivan | G06Q 10/00 705/51 |
| 2015/0279178 | A1* | 10/2015 | Hyde | A61B 5/0022 340/815.4 |
| 2015/0312262 | A1* | 10/2015 | Doshi | H04L 67/22 726/1 |
| 2016/0248834 | A1* | 8/2016 | Richards | H04L 65/602 |
| 2016/0249079 | A1* | 8/2016 | Malone | G06F 9/45558 |
| 2018/0165651 | A1* | 6/2018 | Eck | G06Q 10/1091 |
| 2020/0005267 | A1* | 1/2020 | Siefken | G06Q 10/1091 |

OTHER PUBLICATIONS

Baker et al., "The Power of the Salary Link: Assessing the Benefits of Employer-Sponsored FinTech Liquidity and Credit Solutions for Low-Wage Working Americans and their Employers," Harvard Kennedy School, May 2018, 20 pages.

CNBC.com[Online], "Millions of Americans are only $400 away from financial hardship. Here's why," May 23, 2019, [Retrieved on Mar. 16, 2020], retrieved from : URL <https://www.cnbc.com/2019/05/23/millions-of-americans-are-only-400-away-from-financial-hardship.html>, 10 pages.

Daily Pay.Com[Online], "What Are On-Demand Payment Solutions?" Aug. 8, 2018, [Retrieved on Mar. 16, 2020], retrieved from: URL <https://business.dailypay.com/blog/what-are-on-demand-payment-solutions>, 9 pages.

Dfi.wa.gov [Online],"2017 Payday Lending Report," 2017, [Retrieved on Mar. 16, 202], retrieved from : URL <https://dfi.wa.gov/sites/default/files/reports/2017-payday-loan-report.pdf>, 10 pages.

Even.com [Online], "Walmart" Aug. 27, 2019 [retrieved on Mar. 16, 2020], retrieved from : URL <http://even.com/walmart>, 17 pages.

MarketWatch.com[Online], "The end of the two-week pay cycle: How every day can be payday," Oct. 29, 2018 [Retrieved on Mar. 16, 2020], retrieved from : URL <https://www.marketwatch.com/story/the-end-of-the-two-week-pay-cycle-how-every-day-can-be-payday-2018-10-10>, 6 pages.

NYPost.com [Online]"Online lenders under investigation by regulators in 11 states, Puerto Rico," Aug. 6, 2018, [retrieved on Mar. 16, 2020]. retrieved from : URL <https://nypost.com/2019/08/06/online-lenders-under-investigation-by-regulators-in-10-states-puerto-rico/>, 2 pages.

TechCrunch.com [Online], "Uber's Instant Pay has cashed out $1.3B to drivers in just one year," Apr. 5, 2017, retrieved on [Mar. 16, 2020], retrieved from : URL <https://techcrunch.com/2017/04/05/ubers-instant-pay-has-cashed-out-1-3b-to-drivers-in-just-one-year/>, 7 pages.

Wilson et al., "2017 Financially Underserved Market Size Study," Center for Financial Services Innovation (CFSI), Dec. 2017, 56 pages.

* cited by examiner

CLOUD PLATFORM SERVICES IN INTEGRATED SYSTEM ENVIRONMENT

TECHNICAL FIELD

The present disclosure relates to computer-implemented methods, software, and systems for data processing in a cloud platform environment.

BACKGROUND

Software applications may execute processes in relation to providing user-requested services. Some applications provide financial services to support people need with regard to funds to financially subsidize their needs. People can request funds through services provided by software applications running on infrastructure systems in form of loans, partial loans, mortgages, subsidies, advance payments, etc. People send requests for getting access to financing, for example through software provided services, to support their financial struggling. For example, people may need money between their regular monthly pay checks because of unforeseen expenses, fluctuations of living expenses, changes in social status, etc.

SUMMARY

The present disclosure involves systems, software, and computer implemented methods for utilizing tools and techniques for providing a platform service in relation to received requests for advance payments, such as on demand payments for performed work assignments, from requestors, such as employees. The platform service may be a cloud platform service that provides payment evaluation logic based on received requests and integration with multiple systems running at a corporate platform environment.

One example method may include operations such as receiving, by a cloud platform service, a request from a requestor, wherein the cloud platform service is integrated with a plurality of systems storing data for employees of an enterprise; and providing, by the cloud platform service, a real time estimation of an acceptable amount to be allocated to the requestor, wherein providing the real time estimate comprises: in response to identifying the requestor at an employee record stored at the plurality of systems, acquiring data from at least one of the plurality of systems in relation to the requestor, wherein the data defines performed work tasks, compensation and eligible benefits to be monetized; and determining an acceptable amount by evaluating the acquired data according to a predictive model defined at the cloud platform service according to processing rules defined in relation to different properties of the data. Other implementations of this aspect include corresponding systems, apparatus, and computer programs, configured to perform the actions of the methods, encoded on computer storage devices.

In some instances, instantiating the cloud platform service at a cloud infrastructure environment, wherein the cloud platform service is configured to access the plurality of systems in relation to received requests from employees identified at employee records at the plurality of systems.

In some instances, the employees are defined as objects at the plurality of systems and stored together with corresponding employee data portions of the employee data, and wherein the employee data comprises data related to the performed work tasks, the eligible benefits, employee identification data, and other employee profile data for the enterprise.

In some instances, the at least one of the plurality of systems comprises a first system that executes a first process in relation to tracking data for the employees of the enterprise in a discrete delayed manner at fixed iterations. The data from the first systems that is used to provide the real time estimation may be acquired between two consecutive iterative executions of the first process. The data may be non-current data for the first system.

In some instances, the predictive model may be defined to determine a prediction of data changes in relation to the data from the first system to provide real time estimation based on the non-current data.

In some instances, the real time estimation includes computing a prediction value of a monetized amount corresponding to the performed work tasks, the compensation and the eligible benefits based on the processing rules.

In some instances, the processing rules are defined to measure the properties of the data, and wherein the predictive model applies data evaluation based on measures of the properties in relation to predefined threshold values by the enterprise.

In some instances, the example method further comprises providing, by the platform service, an instruction to a financial service associated with the plurality of systems and the enterprise, to execute a transaction according to the determined acceptable amount for the requestor.

Similar operations and processes may be performed in a system comprising at least one process and a memory communicatively coupled to the at least one processor where the memory stores instructions that when executed cause the at least one processor to perform the operations. Further, a non-transitory computer-readable medium storing instructions which, when executed, cause at least one processor to perform the operations may also be contemplated. In other words, while generally described as computer implemented software embodied on tangible, non-transitory media that processes and transforms the respective data, some or all of the aspects may be computer implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
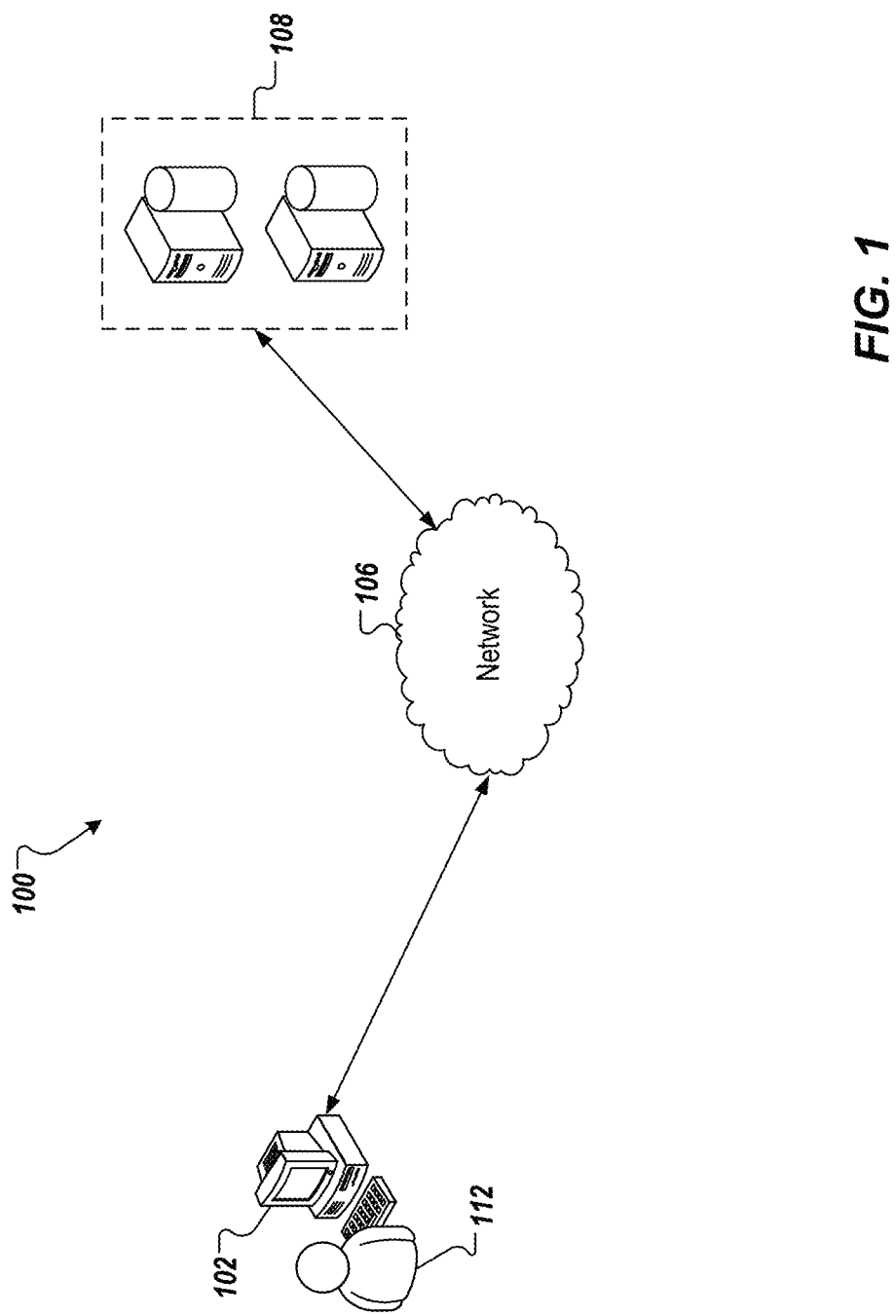
FIG. 1 illustrates an example computer system architecture that can be used to execute implementations of the present disclosure.

The present disclosure describes various tools and techniques for providing a platform service in relation to received requests from requestors (e.g., employees) for advance payments. The platform service may be a cloud platform service that provides payment evaluation logic based on received requests and integration with multiple systems running at a cloud platform environment of a corporation providing work and compensations to performers.

The received requests at the platform service may be requests from employees of an enterprise who want to receive advance intermediate payment in form of a no interest loan or a loan with an interest rate below a threshold value. For example, a loan with an interest rate that is below an average interest rate for receiving a private loan in a given place of business or residency of an employee. The advance payments may be an immediate compensation for already performed work tasks, compensation, and eligible benefits in return for their engagement with the employer. For example, the advance payment may be requested outside of the normal payroll cycle for employees to support their financial needs during a month. Some enterprises may schedule and execute payment just once a month, where due to different external circumstances, an employee may be in financial needs within a given months and may have performed work and activities that correspond to a future paycheck, i.e. can be monetized to a payment amount.

In some instances, to provide such payment evaluation and advance payment estimation, the platform service may be integrated with corporate systems set up to maintain data for employees and enterprise operations and obligations. Such data may be used to identify whether a received request from an employee can be evaluated to an estimated amount that can be later transferred to his account.

The corporate systems may include multiple systems such as human capital management systems, corporate benefits and total rewards systems, payroll services, time and attendance systems, schedule managers, etc. These systems may be instantiated to run different processes in relation to the operations of the enterprise and may have different execution configurations. For example, there may be some systems that run in a delayed mode to populate updates of data into their storages, or that may delay synchronization between systems or data replication. Such systems do not track data real time; however, the payment service receives and process payment requests at real time without delay.

In some instances, a prediction model may be implemented at the platform service to determine a real time estimation of an eligible amount to be transferred to the requestor based on his attendance, performance, and expected compensations as indicated in the multiple system provisioned and running to store data for an enterprise (employer or work provider) and their employees (requestor).

Therefore, the platform service may use the prediction model and a native integration with the systems of the enterprise to serve requests in real time. The implemented prediction model may provide estimation of compensation for performed work that correspond to real time prediction.

The real time prediction of the compensation for performed work and allocated benefits for the period at question may be evaluated according to encoded processing rules at the platform service. These processing rules may support an intelligent and automated process execution to serve request at real time. The implemented platform service and logic provides accurate estimation of an amount for advance payment based on the data that is stored in the used for the prediction as reflected in the systems at the moment of the estimation. The estimation of the amount for advance payment is to be eligibly allocated to an employee and associated with low risk of overpayment. The estimation of the amount is determined to provides guarantees based on the data that is available at the current moment of the data evaluation.

In some instances, the implementation of the platform service natively interacts with the multiple systems running at a platform infrastructure of an enterprise (e.g. corporation), where these systems are of different type and implement processes with different characteristics and requirement. Some of the systems may be developed according to technologies that are integrated internally with other corporate systems within the infrastructure environment of the enterprise but execute processes that do not facilitate real time data maintenance as for example they have delayed data synchronization and replication. Therefore, when an on demand request is received at the platform service, data reliability for real time estimation may be dependent on the alignment between the platform service and the multiple systems storing data to support the execution of the platform service.

The platform service may be deployed productively to provide reliable results with high accuracy rates. When a request is received at the platform service, the request is evaluated based on real time extraction of data from one or more systems running at the enterprise infrastructure environment and evaluate the data according to a prediction model to provide accurate estimation for the received request. The logic implemented at the platform service may take into consideration different criteria to determine the amount, such as past deductions of salary for an employee, garnishments, working patterns, worked hours, past approval processes, etc. based on such considerations, the appropriate data to be used for the estimation may be determined and invoked from relevant systems.

In some instance, a platform service that is integrated to interact with multiple corporate systems storing employee performance data and other data required to provide advance payment estimation for requests provides improved processing as data exchange between systems can be performed with fewer resources, fewer interactions and directed to data that is only relevant for the estimation of the particular request. As the platform service implements a prediction model that can automatically evaluate data and provide a real estimation of compensation for performed work based on tracked work at the multiple systems, the platform service performance is faster, more accurate, more reliable and can ensure a higher level of compliance with various regulatory requirements, including, but not limited to, tax law, wage/hour regulations, financial regulations and consumer protection regulation. The platform service may be configured to interact with client applications of employees to seamlessly provide secure and reliable communication and exchange of data between systems and applications running at different infrastructure environment with different security levels. The platform service provides secure data exchange between systems running at an employee infrastructure, such as employee mobile device, financial institution infrastructures, such as bank systems storing accounts for the employees and the employer (enterprise), and enterprise infrastructure.

In some instances, the platform service is instantiated at a cloud platform environment and is configured to communicate in a trusted manner with a customer environment where multiple systems are running. The multiple systems at the customer environment may be cloud systems and on premise systems, or combination of those. The landscape at the customer environment may be specifically configured to the processes that run in relation to the operations of the customer. Data may be stored, maintained, updated and populated between systems according to configured integration processes, where due to technology specific of some or all of these systems, data may not be real time data at every single time point. The platform service is natively integrated to communicate with the multiple systems at the customer environment and to authenticate in secure manner. The platform service may invoke data at runtime and evaluate that data based on the implemented logic to predict real time data based on currently stored and observed data at the systems running at the customer environment.

The platform service may receive requests from end user that provide parameters for requesting compensations for performed work. The platform service may processes such request, verify their identity and seamlessly transform the received request according to the implemented logic to acquire needed data from one or more of the systems at the customer environment, and process that data according to implemented prediction model to determine predictable value of performed work and allocated benefits that can be eligible monetized for the requestor. The platform service provides interfaces to communicate with different systems and applications and exchange data in fast and reliable manner.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a platform implemented service to provide implemented logic to evaluate request for providing payment evaluation services in relation to request to determine acceptable amount to be paid as advance payments for already performed work an earned benefits at an enterprise. The payment evaluation service may implement logic for determining the acceptable eligible amount that corresponds to real acquired income that can be transferred as an intermittent payment. Thus, performed work activities and assigned benefits in different form and type from an employer to and employee that are tracked at enterprise systems may be monetized at real time and provided as finances to the requestor.

Figure 2:
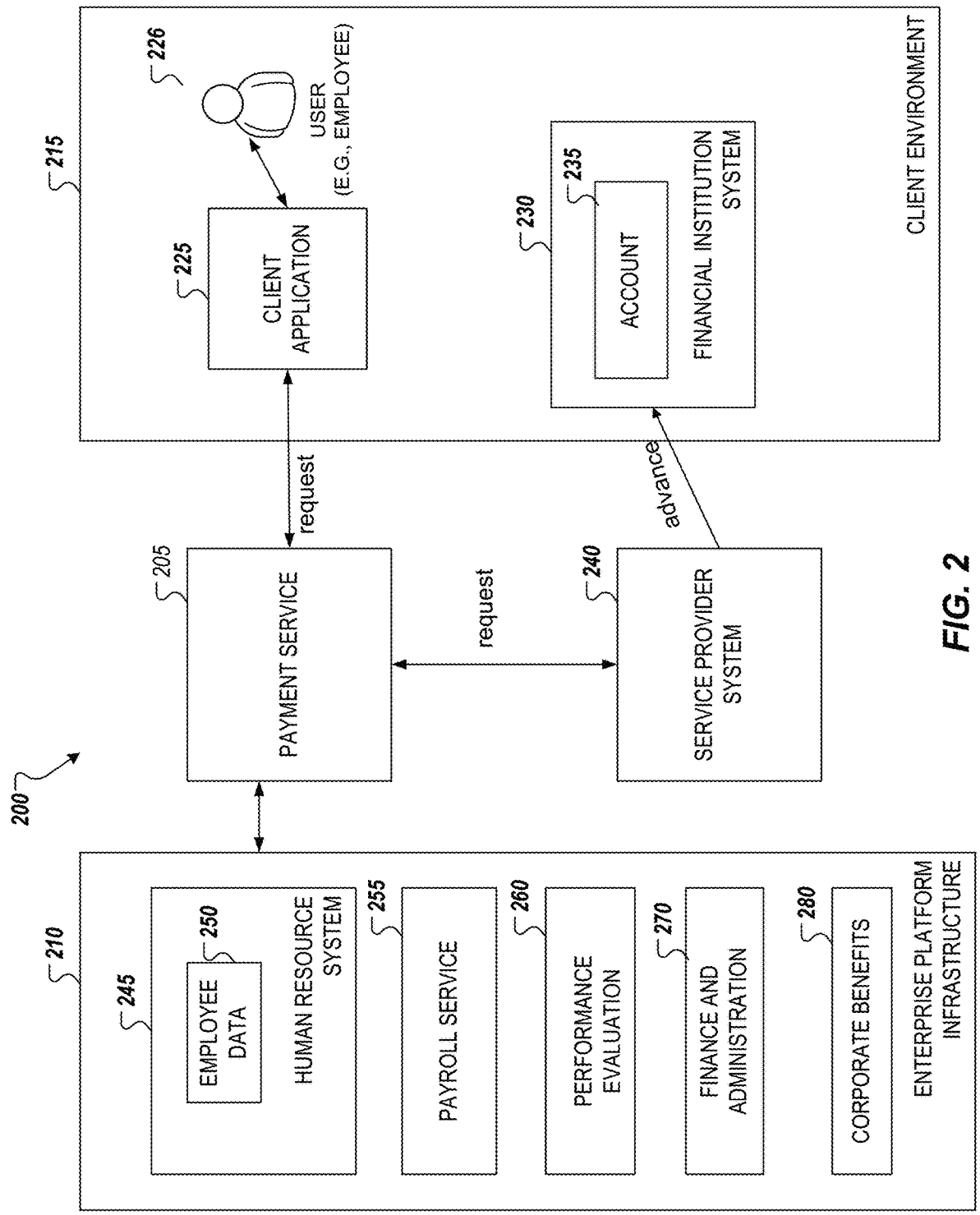
FIG. 2 is a block diagram illustrating an example system for executing service requests at a cloud platform integrated with enterprise systems in accordance with implementations of the present disclosure.
Figure 3:
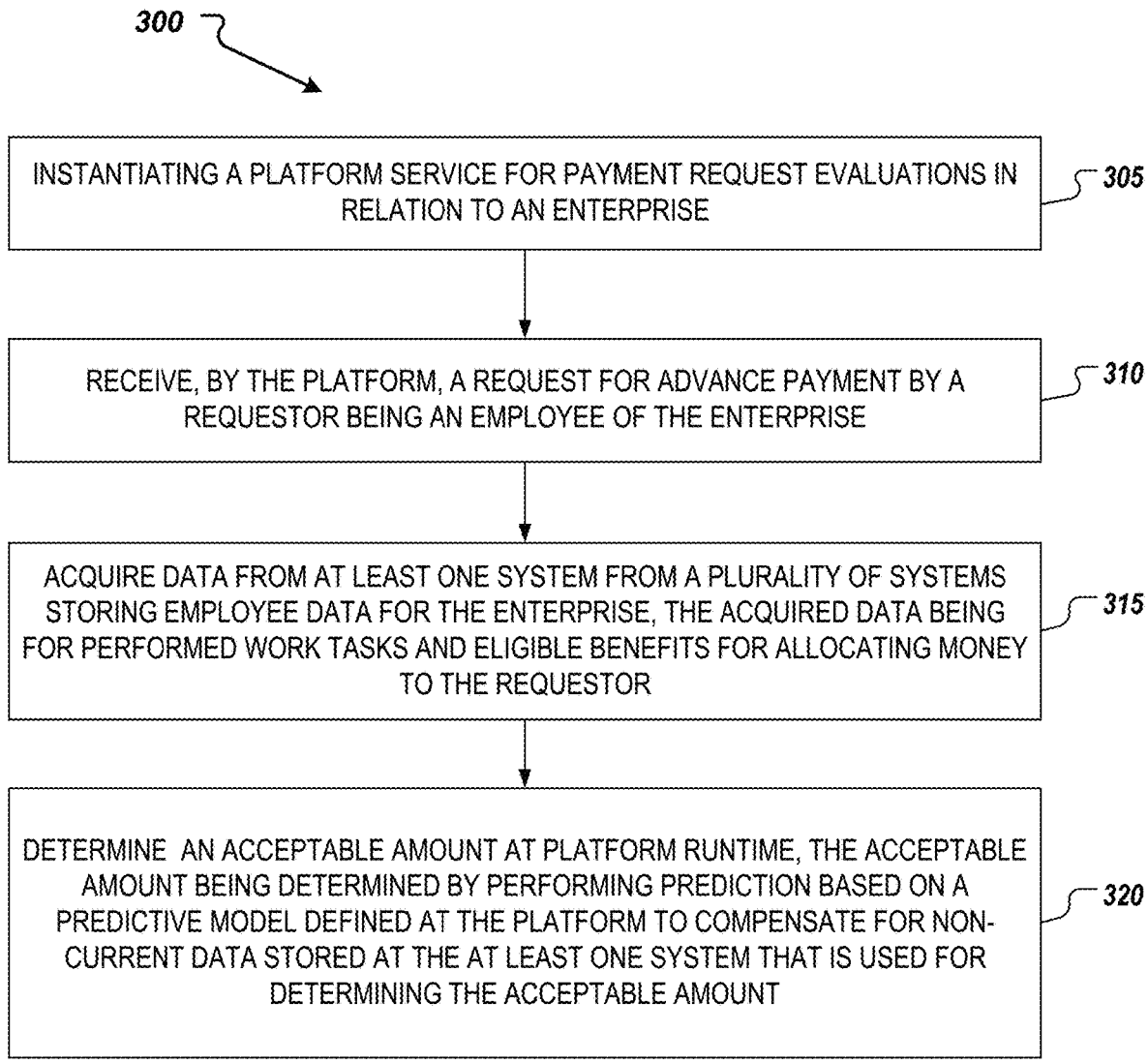
FIG. 3 is a flowchart for an example method for providing real time estimation services at a cloud platform in relation to requests from employees for monetarization of performed work tasks, compensation, and eligible benefits in accordance with implementations of the present disclosure.
Figure 4:
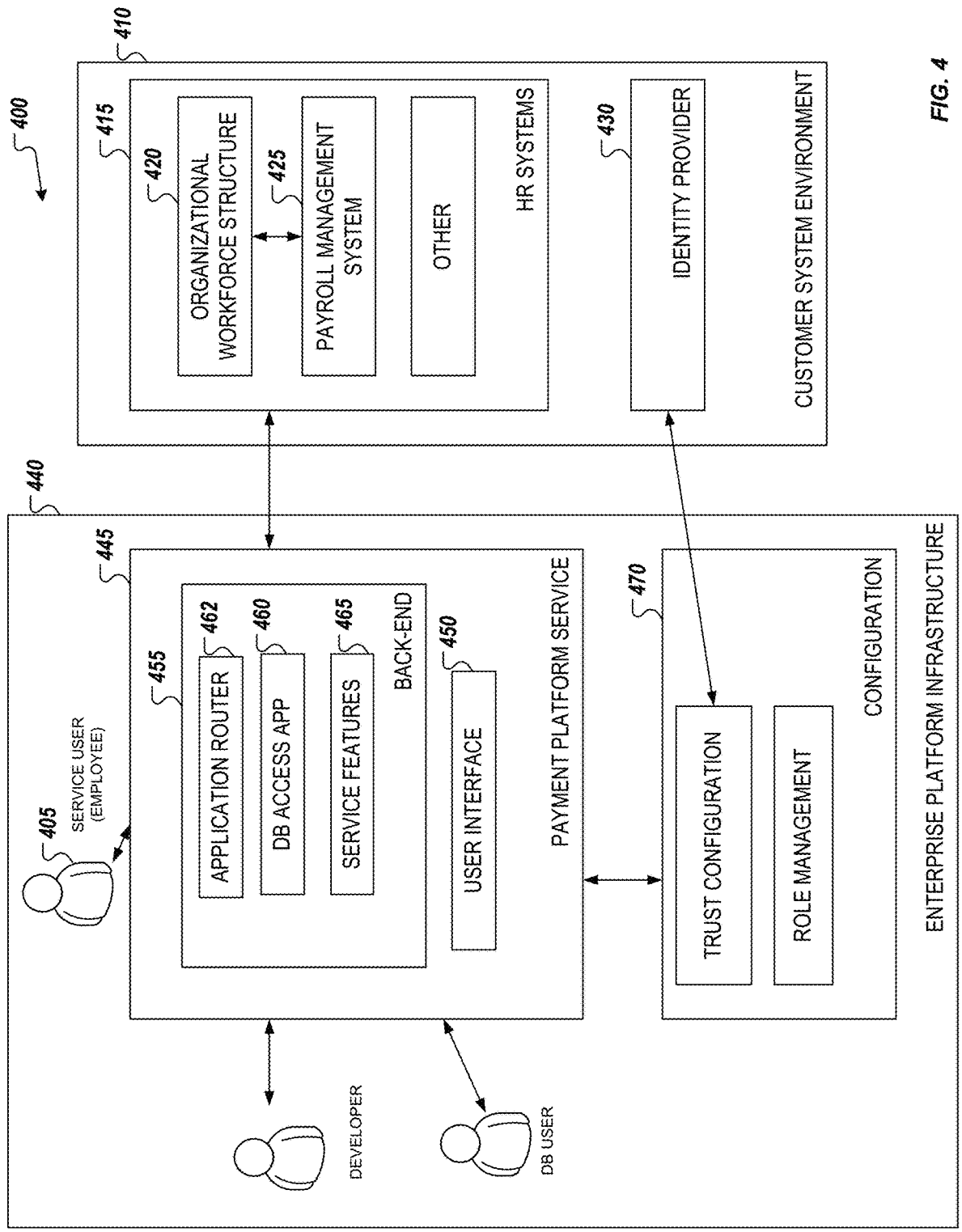
FIG. 4 is a block diagram for an example system for providing real time estimation services at a cloud platform in relation to requests from employees for monetarization of performed work tasks, compensation, and eligible benefits in accordance with implementations of the present disclosure.

In some instances, the server system 104 may host a payment service, such as the discussed services in relation to FIGS. 2, 3, and 4. The payment service may be cloud platform service for evaluation of requests from employees for advance compensation for already performed duties for employer, where the payment service is natively integrated to corporate systems of an enterprise to provide real time evaluation of data and serve request on demand.

FIG. 2 is a block diagram illustrating an example system 200 for executing service requests at a cloud platform integrated with enterprise systems in accordance with implementations of the present disclosure. The system 200 includes a payment service 205 that is implemented at a cloud platform to provide services to request in relation to an enterprise platform infrastructure 210 where multiple systems are running. The received request may be associated with a specific period to correspond to the advance payment, for example, 3 days, 5 days, 2 weeks, etc. Different configurations of defining the request may be supported. The payment service 205 is integrated with the systems running at the enterprise platform infrastructure 210 and can seamlessly extract data and perform real time data evaluations to provide services to end user.

In some instances, a client environment 215 is set up, where a client application 225 is running and is in communication with a user 226. The user 226 may be an employee of an enterprise that is related to the enterprise platform infrastructure 210 and the executed systems thereof. For example, the enterprise may be a large corporation which has implemented and configured for running multiple systems, including cloud based systems and on premise systems to support enterprise execution and administrations.

The enterprise platform infrastructure 210 may be used for systems in different corporate areas and providing different types of services related to the executions of the enterprise as an entity performing transactions, defining rules for operations, executions, analysis, etc. The enterprise may store data in special database systems or specific applications that are configured to execute enterprise processes. The enterprise systems may store data in form of data object related to employees and other organizational entities.

The enterprise platform infrastructure 210 may provide software and hardware resources for execution of platform systems including human resource system 245, payroll services 255, performance evaluation 260, finance and administration 270, and corporate benefits 280. The human resource system 245 may include a subsystem storing data for time and attendance of employees, workers, consultants, etc. These systems may store data in relation to all employees and different type and data category. For example, stored data between these systems may be mapped to provide different types and categories of data in relation to a single employee. For an employee, based on data from the human resource system 245 and the included employee data 250 there, it may be determined when the employee had started performing a certain job, how long has he been in the corporation, what is his role, what is his education, what is his position, what kind of an employee he is (full time, part time, limited part time, etc.). Further details may also be stored in the human resource system.

In some instances, an enterprise may store data in relation to their corporate benefits policy in the corporate benefits 280 system. Such corporate benefits 280 may include different type of social benefits, including vacation time allocation, extra time payment policy, vouchers for food, allocated money for subscriptions (e.g., sports, technology, health), health benefits, corporate discounts, equity policies, etc. Such corporate benefits 280 may be evaluated and a corresponding monetary value may be determined. Some or all of the benefits defined at the corporate benefits 280 and correspondingly associated with different employees based on their role, profile, etc. may be used by the payment service 205 to determine an eligible amount for advance payment to an employee. As an example, vacation days up to a given threshold may be monetized and pre-paid to an employee upon request. Other eligible benefits and their corresponding monetization rules may be configured at the payment service 205.

Further, the payroll services 255 implemented and running at the enterprise platform infrastructure 210 may provide logic for execution processes related to performing payments and controlling activities. The payroll services 255 may for example be configured to initiate payment execution to different employees on different dates or regular intervals according to predetermined rules. For example, all full time employees may be associated with a rule to execute payment transactions on every first day of the first working week that is a working day of the next month subsequent to the month of performed work. Also, employees that are on temporary contracts may be associated with a rule to execute payment every two weeks, and other possible configuration. To reduce load of transaction executions, such payment transfers and instructions may be spread over time to improve system performance and load balance whenever a company has hundreds and thousands of employees where regular transactions associated with payments has to be performed.

In some instances, at the enterprise platform infrastructure 210 there are one or more systems that store data for the employees in form of objects that are defined as employee data that includes data related to the performed work tasks, the eligible benefits, employee identification data, and other employee profile data for the enterprise. Such data may be not only the employee data 250, but also data stored at other systems that can be mapped to a single user and acquired as a subset of data entries at multiple systems.

In some instances, some of the systems running at the enterprise platform infrastructure 210 are systems configured to perform replication of data, and landscape synchronization in delayed form and do not execute all of their processes at runtime, but rather based on a schedule. Therefore, some of the systems has period of time when the data that they store is not cohesive and do not reflect the real current snapshot of activities and assets assigned to the employees.

In some instances, the user 226 who is an employee of the enterprise associated with the systems running at the enterprise platform infrastructure 210 sends a request to the payment service 205 to request advance payments for performed work duties which has not been compensated with payment or in another form (e.g. vouchers, virtual currencies, etc.). When the request is received at the payment service 205, the payment service has to evaluate the request and to provide an estimation of an amount that can be provided as an advance payment or a load, that is covered by the fact that the corresponding work is already been performed by the user 226.

The payment service 205 is configured to identify the user 226 based on the received request that can be received through a client application 225 used by the user 226. For example, the user may use his handheld device where he can run the client application 225 and monitor his work activities and pay checks. The client application 225 when instructed to request advance payment, may send a data request to the payment service providing user identifiable information that can be used to verify and validate that the request is coming from an authorized user who has been provided with the capabilities to request such payment services 205.

The payment service 205 is natively integrated with the systems running at the enterprise platform infrastructure 210 to request and receive data in relation to employees of the enterprise. As the payment service 205 is integrated with the systems, the payment service 205 can access data in real time and process the data to provide real time services to requestors, such as employees who request advance payments from their employer.

The payment service 205 identifies the requestor based on the received request. For example, the user may use credentials and password to authenticate and identify as a legitimate user to request services through the payment service 205. The payment service 205 determines whether he is an employee, for example, by acquiring relevant data from the systems running at the enterprise platform infrastructure 210. In some instances, the payment service 205 may determine the identity of the request by verification performed through communication with the human resource system 245 including the employee data 250. When the user 226 is identified as an employee, the payment service 205 may acquire acquiring data from at least one of the plurality of systems in relation to the requestor. The acquired data includes data defining performed work tasks, compensation, and eligible benefits to be monetized. For example, the data may define the number of hours spent at the working place, or the number of hours spent at a client's facility, or a type of an assignment, etc. The eligible benefits may include bonuses that are allocated by the employer to the employee. The eligible benefits may be evaluated and monetized based on received requests and allocation according to configured system rules.

In some instances, the eligible benefits may include different forms of corporate benefits that can be offered and assigned to employees based on their performance. Eligible benefits may be only a part of the benefits provided to an employee. Employees are usually provided with vacation days as part of their employment, a part of the vacation days (or the whole time) can be considered as eligible benefit that can be monetized. For example, an employee may be provided with 30 days of paid vacation for a year, which means that every month one can take 2.5 days of vacation. However, an employer may have configured rules that even if the employee had not taken all of his days of paid vacation, he would be reimbursed for not used vacation only up to a certain limit, such as 20 days. In this context, if an employee wants to request advance payment for a current period of time which has not been already paid, a number of days corresponding to the days he worked and in relation to the maximum days he can be reimbursed for such days may be monetized. In particular, if the employee requests advance payment in the middle of a certain month, the limit of vacation days that he can get reimbursed for (e.g., received monetary equivalent to these days) can be equal to 20 divided by 12 that equals 1.67, which has to be divided by 2, as the period is half of a month that equals 0.83 days. That number of days can be monetized based on the daily salary payment for the employee or an estimation of his daily payment according to evaluation of data stored for his performance and attendance to work activities and received payments.

In some instances, the payment service 205 determines an acceptable amount by evaluating the acquired data from one or more of the systems running at the enterprise platform infrastructure. The number of systems that are requested for data and that provide data in relation to the request may vary and depend on the requestor and the type of data stored for him at the systems. The data is acquired at real time during the execution of the payment service 205. In some instances, access to systems where data is acquired from may be associated with slower access, and therefore data replication and/or caching can be configured for such systems to improve efficiency and operations. As some of the systems at the enterprise platform infrastructure 210 may have data that is not corresponding to current actual work performance/status of the employee, the payment service 205 may use a predictive model to determine a real estimation of what has been earned by the employee and what can be an eligible acceptable amount to be provided to the requestor. The predictive model may be implemented in the logic of the payment service 205 and may have encoded processing rules defined in relation to different properties of the data acquired from the various systems. For example, at a given system that acknowledges employees attendance every day, the data for the attendance may be populated every day at 5 pm. However, the employee may request for advance payment at 4 pm of a given day, when he has attended work and is performing his regular duties. The prediction model may be configured to acquire data from the system, and even though the current day may not be indicated as a day where the employee had worked, as the request is processed at a time after 4 pm but before 5 pm, and still determine that the employee may be provided with advance payment for that current day based on performed prediction and data available from planned work schedules or other data that allows to draw conclusions as to the employee's work patterns. The prediction model may be used to predict for example performed work, but also may be used to predict approved work after the work has been input as completed in one of the systems. Further, the prediction model may also predict an expected compensation for the performed work, allocated eligible benefits for the requestors and/or other compensations that are allocated for the requestor in accordance with configurations at the systems storing data for the employee. For example, the used data by the prediction model may be associated with data about time entries of employees, approved time entries of employees according to an internal review process, and/or allocated compensation benefits, such as bonuses and commodities.

In some instances, the performed prediction may take into account how often the employee is taking vacation or leaves, has he been on a sick leave previous day, has he requested vacation that has not been approved yet for the current day, etc. The prediction model can be configured according to requirements of the enterprise and any specific system rules configured for the systems running at the enterprise platform infrastructure.

In some instances, when the payment service 205 determines an acceptable amount to be provided as an advance payment to the requestor, the payment service 205 may communicate that amount with the user 226 through the client application 225. Further, the payment service 205 may request to execute a transaction payment to the user 226 through a service provider system 240. That service provider system 240 may be a trusted system for the payment service and the enterprise. The service provider system may receive an instruction from the payment service 205 that identifies the entity to be provided with the advance payment. The instruction may identify the user with legal credentials (legal name, social security number, other) and details for executing a transaction to his account (e.g. bank account). The service provider system 240 may instruct a financial institution, such as a bank, to send an advance payment to an account 235 that is defined for the user 226 at a financial institution system 230. The advance payment is in form of a bona-fide loan provided by an financial service provider that is received before a pay date but corresponds to earned amount of money or other equivalence that can be used for reimbursing an employee for performed tasks and earned benefits according to his legal contract with the enterprise.

In some instances, the executed advance payment is an on-demand payment that is outside of the regular schedule of payroll, as for example defined at the payroll services 255.

As the payment service 205 can interact with all of the systems at the enterprise platform infrastructure, the payment service 205 may also be configured to support request from employees and provide options for rescheduling of work activities that may reflect on a change in the determined acceptable amount to be paid. For example, the payment service 205 may include logic to evaluate the schedules at some of the systems at the enterprise platform infrastructure and suggest reallocation of shifts for some employees to increase the number of worked hours for an employee within a closer time frame in the future and thus allow an employee to increase their future earnings, e.g., when an employee needs to make an urgent payment, and it is already clear that his remaining wages will not cover his expenses throughout the pay cycle.

FIG. 3 is a flowchart for an example method 300 for providing real time estimation services at a cloud platform in relation to requests from employees for monetarization of performed work tasks, compensation, and eligible benefits in accordance with implementations of the present disclosure. The method 300 may be executed at the example system and provided environment discussed in relation to FIG. 2.

At 305, a platform service is instantiated at a cloud infrastructure environment. The platform service may be a cloud platform and may be configured to run at the cloud infrastructure together with other provided cloud service. The platform service is configured to access a plurality of platform systems from an enterprise integrated environment. For example, the platform systems may be such as the systems running at the enterprise platform infrastructure 210, FIG. 2. The platform service is instantiated to received requests from users, such as employees of an enterprise associated with the platform systems.

At 310, a request for advance payment is received by a platform service for payment request evaluations. The request is received from a requestor who is an employee from the employees of an enterprise. The request is received at the platform service. The platform service is integrated with a plurality of systems storing employee data for the enterprise. The platform service may be integrated with the systems from the enterprise environment, for example, including human resource systems storing employee data, payroll systems, time management, administration, finance, talent and acquisition, corporate benefits systems, etc.

In some instances, the received request is from an employee of the enterprise to receive advance payment for his performed worked for a particular time period, such as the current month, where he has not yet been transferred his monthly salary payment. For example, employees sometimes receive their salaries for a given month at a first working day of a subsequent month, e.g. salary for October is received on first working day of November. Therefore, there are period of time in a given month, where work is performed but payment is yet to be received. Payment for such period may be requested by an employee at the platform service, as discussed at 310. The request for payment is evaluated to determine what kind of performed activities by the employee since his latest payment can be monetized.

At 315, based on the received request for advance payment, a requestor is identified and it may be determined whether the requestor is an employee of the enterprise associated with the integrated plurality of systems with the platform service. Data from at least one of the plurality of systems in relation to the requestor is acquired. The requestor can be identified as an employee of the enterprise associated with the plurality of systems integrated with the platform service, for example, based on provided credentials or identification from the requestor when accessing the platform service.

In some instances, a first system of the systems where data is acquired is a system with a delayed process execution that is not performed at runtime. The first system executes a first process in relation to tracking data for the employees of the enterprise in a discrete delayed manner at fixed iterations. For example, a system where work schedule is performed based on logging of data entries performed through the day based on employees' entries, e.g. with a card, or chip, can be propagated and synchronized with other systems only once per day. Therefore, there may be moments of time before a synchronization or update point of a system that the actual data of tracked time is not populated and the system include data that is currently old. Such data would be updated based on a next iteration of execution of a process at the system to populate the data with the current indications corresponding to received input.

In some instances, data acquired from a first system may not be actual real time data that should be tracked, as data discrepancies may arise from specifics of processes executed at the first system. The acquired data from the first system may be data acquired between two consecutive iterative executions of a first process at the first system. Such a first process may be replication process executed in iterations with fixed time intervals, or may be a synchronization process between multiple systems and data fields within the first systems. Also, the first process may be transformation process that is running in delayed mode and not runtime as a result of every new entry of data or every change in the database. The data at the first system where such processes are implemented is non-current data at certain time points and intervals and cannot be properly relied on when performing real time execution based on such data. The data from the first systems is used to provide a real time estimation of the data in the first system and to acknowledge whether there are discrepancies that can be covered through performing prediction of the real data. Such prediction may be performed based on evaluation of historic data stored in relation to the requestor at one or more of the systems associated with the enterprise.

In some instances, the acquired data for the employee defines performed work tasks, compensation, and eligible benefits for allocating money to the requestor. Based on the predictive model, the acquired data is evaluated to determine real estimation of compensation for performed work and allocated benefits for the requested period. The determined estimation based on the acquired data is evaluated according to processing rules defined in relation to different properties of the data to provide a real time estimation of an amount that can be advanced to the requestor prior to a next payroll compensation execution.

At 320, an acceptable amount is determined to be allocated to the requestor. The acceptable amount is provided at runtime of the platform service and is based on a real time estimation of the compensation for performed work of the requestor and eligible benefits for allocating money to the requestor. The provided real time estimation is determined based on the received request and the requestor. The performed work, such as work tasks, may be tracked at different systems and in different format. For example, performed work may be tracked as tasks, projects, assignments, daily routines, etc. Such tracked work task may be also associated with a performance rate, a number of hours for performing the work task, or cost of the work (fixed or hourly determined payment or salary allocated).

The acceptable amount determined at 320 is computed based on performing a prediction according to a prediction model defined at the platform service. The prediction model is defined at the platform service to provide prediction of real time data and thus to compensate for non-current data stored at any one of the systems from which data is acquired at 315 and to compensate for future events and process outcomes that may impact an employee's eligible compensation in the pay cycle during which the advance is made. For example, to compensate for non-current at the first system from the at least one system as discussed above. Based on such a prediction of the current real data, an acceptable amount for allocating to the requestor is determined runtime and according to expected requirement as defined at different system.

In some instances, the predictive model is defined to determine a prediction of data changes in relation to the data from the first system to provide real time estimation based on the combination of non-current data and current data. Real time estimation includes computing a prediction value of a monetized amount corresponding to the performed work tasks and the eligible benefits based on the processing rules.

In some instances, the determination of acceptable amount at 320 is performed to determine a monetized amount corresponding to performed work activities and assigned benefits for the requestor. The monetization is done according to processing rules encoded in the platform service that may be configured by the enterprise being the employer of the requestor and the funding provider being the entity that bears the risk of the loans seeking to control the risk. The processing rules are defined to measure the properties of the data that is acquired from the related systems to the requestor at 310. The predictive model that is used to determine the acceptable amount at real time applies data evaluation based on measures of the properties in relation to predefined threshold values by the enterprise and the funding provider.

In some instance, based on determining the acceptable amount, the platform service provides an instruction to a financial service associated with the plurality of systems and the enterprise. The provided instruction is for executing a transaction according to the determined acceptable amount for the requestor. The financial service is configured to operate for financial transactions related to the enterprise. In such manner, the determined amount may be transferred according to the logic of the financial service to a bank account, prepaid card, or payroll card of the requestor, or may be provided in other monetary type, such as a check, voucher, deposit, etc. Other forms of executing a transfer of money from the enterprise to the requestor may be also appreciated as covered by the described transaction execution.

FIG. 4 is a block diagram for an example system 400 for providing real time estimation services at a cloud platform in relation to requests from employees for monetarization of performed work tasks, compensation and eligible benefits in accordance with implementations of the present disclosure.

An enterprise platform infrastructure 440 is configured for running a payment platform service 445. The payment platform service 445 may be such as the payment service 205, FIG. 2, or the platform service discussed above and in relation to FIG. 3. The payment platform service 445 is a cloud service that provides a user interface 450 that may be exposed to requestor such as a service user 405. When a request from a user, such as the service user 405 is received, an application router 462 may evaluate the request and determine properties of the request and the requestor. The application router 462 may identify the requestor and perform verification and validation in relation to configured enterprises and enterprise platform systems integrated with the payment platform service 445.

The application router 462 uses the configuration 470 that is set up at the enterprise platform infrastructure 440 to determine enterprise identity. The configuration 470 is maintained to provide trusted configurations between the payment platform service 445 and a customer systems environment 410. The customer system environment 410 is an environment of an enterprise where different systems are running. The customer system environment 410 may be such as the enterprise platform infrastructure 210, FIG. 2. The customer system environment 410 includes an identity provider 430 component that can be used to perform identity authentication of requests received from payment platform services such as the payment platform service 445 and also requests received from different requestors. The payment platform service 445 may be configured as a trusted entity for interaction with systems from the customer system environment 410 when these requests are associated with a predefined list of users. Therefore, the payment platform service 445 may verify identity of requests and provide corresponding actions based on the verification—to either perform payment estimation or to decline the request.

The service user 405 may be an employee of an enterprise that requests advance payment for performed work activities and eligible allocated benefits by the employer. The user 405 may request for such advance payment outside of the payment cycle to support his financial needs. The advance payment may be determined as a payment that correspond to performed duties and thus non-risky and in form of a fully guaranteed loan with no or low interest that can be transferred from a bank account of a $3^{rd}$ party funding provider to a bank account of an employee.

The payment platform service 445 includes a database access application 460 and service features 465 as part a back-end 455 logic implemented at the service 445. The database access application 460 provides functionality to request and acquire data from database storages and systems at the customer system environment 410. The service features component 465 include logic to evaluate acquired data and to provide real time estimate for acceptable amount payable to an employee in return for performed work tasks and allocated benefits for a time period requested. The service features 465 may include a defined prediction model to evaluate acquired data from the systems and transform it into a prediction of real time performed work and allocated benefits. The prediction is performed due to differences between tracked and real performed data at some or all of the systems at the customer system environment 410 because of delayed process execution, data transferring, synchronization, replication, or the like.

The payment platform service 445 interacts with systems at the customer system environment 410 in a corresponding manner as the payment service 205 interacts with systems at the enterprise platform infrastructure 210. In response to identifying the service user 405 requests services at the payment platform service 445, the service 445 may determine that the service user 405 is an employee. The request may be received for advance payment at a time period between two consecutive regular payment executions of the employer of the requestor. The request may be associated with a specific period to correspond to the advance payment, for example, 3 days, 5 days, 2 weeks, etc. Different configurations of defining the request may be supported.

The requestor may be identified as an employee based on identifying a data record stored at a system at the customer system environment corresponding the identity of the service user 405. The payment platform service 445 may acquire data from at least one of the systems running at the customer system environment in relation to the request. The customer system environment 410 includes human resource (HR) systems 415 including an organization workforce structure 420 system, a payroll management system 425, and other systems. The organization workforce structure 420 system and the payroll management system 425 store data in relation to performed work by employees, data about the employees and their corporate role and performance, executed payment for their performances, data about deductions and/or garnishments, information about working patterns, worked hours, shifts. Further, the systems may also include data for previous requests for advance payment or other approvals for receiving financial support. The HR systems 415 includes the data that defines performed work tasks, compensation, and eligible benefits that can be evaluated to determine a real estimate of the performed work and eligible benefits and that real estimate to be monetized to a payment amount that can be transferred to the requestor.

In some instances, the payment platform service determines an acceptable amount by evaluating the acquired data one or more systems at the customer system environment 410, as discussed in relation to FIG. 2 and/or FIG. 3. The according to a predictive model defined at the payment platform service 445 and processing rules defined in relation to different properties of the data for evaluation, a real time estimation of an acceptable amount to be allocated to the requestor is determined. The processing rules may be executed over the predicted definition of performed work tasks, compensation, and eligible benefits that can be allocated to the requestor.

Figure 5:
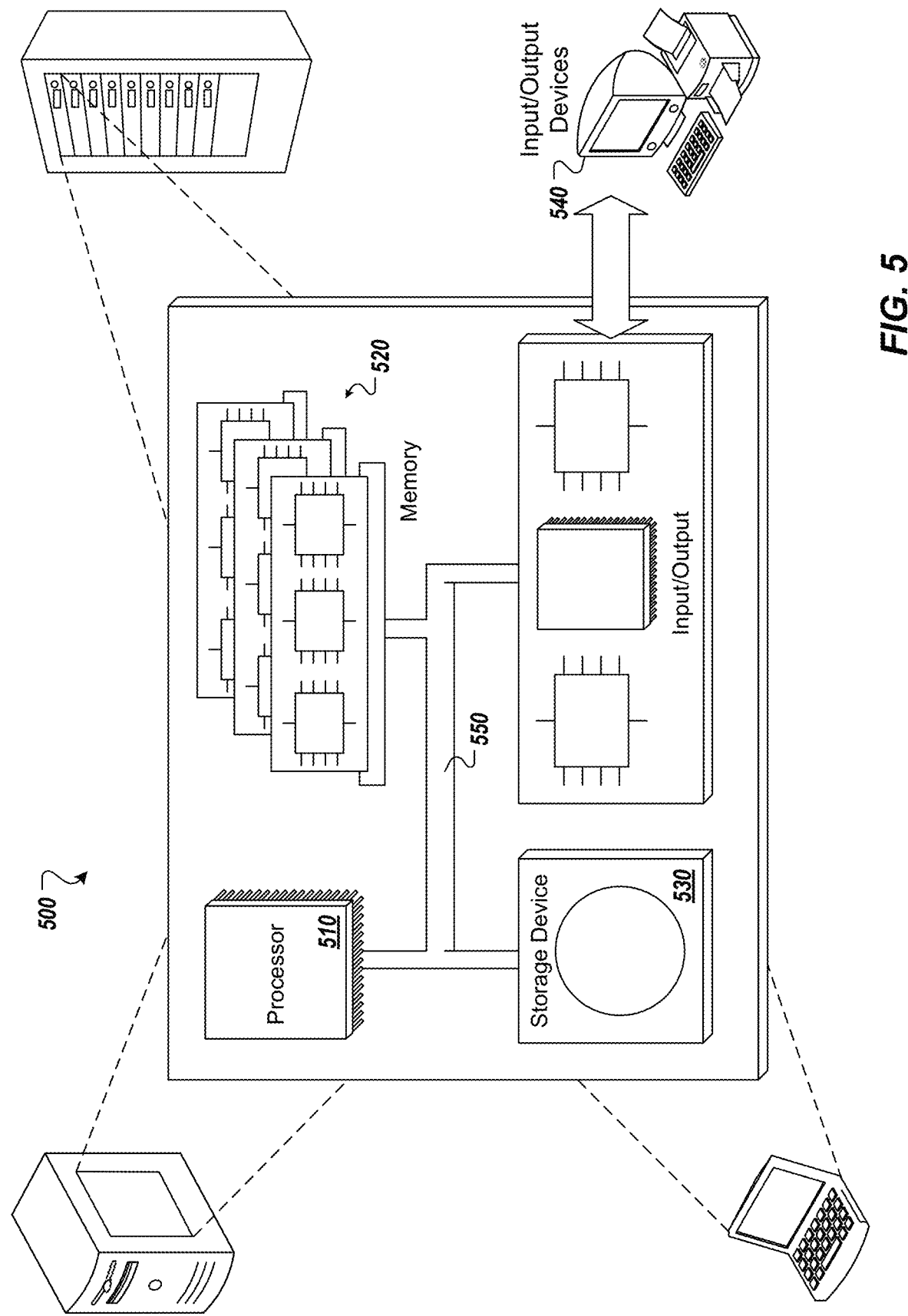
FIG. 5 is a schematic illustration of example computer systems that can be used to execute implementations of the present disclosure.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer implemented method comprising:
  receiving, by a cloud platform service, a request from a requestor, wherein the cloud platform service is integrated with a plurality of systems storing data for employees of an enterprise; and
  providing, by the cloud platform service, a real time estimation of an acceptable amount to be allocated to the requestor, wherein providing the real time estimate comprises:
    in response to identifying the requestor at an employee record stored at the plurality of systems, acquiring data from at least one of the plurality of systems in relation to the requestor, wherein the data defines performed work tasks, compensation and eligible benefits to be monetized; and determining an acceptable amount by evaluating the acquired data according to a predictive model defined at the cloud platform service according to processing rules defined in relation to different properties of the data.

2. The method of claim 1, further comprising:
instantiating the cloud platform service at a cloud infrastructure environment, wherein the cloud platform service is configured to access the plurality of systems in relation to received requests from employees identified at employee records at the plurality of systems.

3. The method of claim 2, wherein the employees are defined as objects at the plurality of systems and stored together with corresponding employee data portions of the employee data, and wherein the employee data comprises data related to the performed work tasks, the eligible benefits, employee identification data, and other employee profile data for the enterprise.

4. The method of claim 1, wherein the at least one of the plurality of systems comprises a first system that executes a first process in relation to tracking data for the employees of the enterprise in a discrete delayed manner at fixed iterations.

5. The method of claim 4, wherein the data from the first systems that is used to provide the real time estimation is acquired between two consecutive iterative executions of the first process, and wherein the data is non-current data for the first system.

6. The method of claim 5, where the predictive model is defined to determine a prediction of data changes in relation to the data from the first system to provide real time estimation based on the non-current data.

7. The method of claim 1, wherein the real time estimation includes computing a prediction value of a monetized amount corresponding to the performed work tasks, the compensation and the eligible benefits based on the processing rules.

8. The method of claim 1, wherein the processing rules are defined to measure the properties of the data, and wherein the predictive model applies data evaluation based on measures of the properties in relation to predefined threshold values by the enterprise.

9. The method of claim 1, further comprising:
providing, by the platform service, an instruction to a financial service associated with the plurality of systems and the enterprise, to execute a transaction according to the determined acceptable amount for the requestor.

10. A non-transitory, computer-readable medium coupled to one or more processors and having instructions stored thereon which, when executed by the one or more processors, cause the one or more processors to perform operations, the operations comprising:
receiving, by a cloud platform service, a request from a requestor, wherein the cloud platform service is integrated with a plurality of systems storing data for employees of an enterprise; and
providing, by the cloud platform service, a real time estimation of an acceptable amount to be allocated to the requestor, wherein providing the real time estimate comprises:
in response to identifying the requestor at an employee record stored at the plurality of systems, acquiring data from at least one of the plurality of systems in relation to the requestor, wherein the data defines performed work tasks, compensation and eligible benefits to be monetized; and
determining an acceptable amount by evaluating the acquired data according to a predictive model defined at the cloud platform service according to processing rules defined in relation to different properties of the data.

11. The computer-readable medium of claim 10, further storing instructions which when executed by the one or more processors, cause the one or more processors to perform operations comprising:
instantiating the cloud platform service at a cloud infrastructure environment, wherein the cloud platform service is configured to access the plurality of systems in relation to received requests from employees identified at employee records at the plurality of systems,
wherein the employees are defined as objects at the plurality of systems and stored together with corresponding employee data portions of the employee data, and wherein the employee data comprises data related to the performed work tasks, the eligible benefits, employee identification data, and other employee profile data for the enterprise.

12. The computer-readable medium of claim 10, wherein the at least one of the plurality of systems comprises a first system that executes a first process in relation to tracking data for the employees of the enterprise in a discrete delayed manner at fixed iterations, and wherein the data from the first systems that is used to provide the real time estimation is acquired between two consecutive iterative executions of the first process, and wherein the data is non-current data for the first system.

13. The computer-readable medium of claim 12, where the predictive model is defined to determine a prediction of data changes in relation to the data from the first system to provide real time estimation based on the non-current data.

14. The computer-readable medium of claim 10, wherein the real time estimation includes computing a prediction value of a monetized amount corresponding to the performed work tasks, the compensation and the eligible benefits based on the processing rules, wherein the processing rules are defined to measure the properties of the data, and wherein the predictive model applies data evaluation based on measures of the properties in relation to predefined threshold values by the enterprise.

15. The computer-readable medium of claim 10, further storing instructions which when executed by the one or more processors, cause the one or more processors to perform operations comprising:
providing, by the platform service, an instruction to a financial service associated with the plurality of systems and the enterprise, to execute a transaction according to the determined acceptable amount for the requestor.

16. A system comprising
a computing device; and
a computer-readable storage device coupled to the computing device and having instructions stored thereon which, when executed by the computing device, cause the computing device to perform operations, the operations comprising:
receiving, by a cloud platform service, a request from a requestor, wherein the cloud platform service is integrated with a plurality of systems storing data for employees of an enterprise; and
providing, by the cloud platform service, a real time estimation of an acceptable amount to be allocated to the requestor, wherein providing the real time estimate comprises:

in response to identifying the requestor at an employee record stored at the plurality of systems, acquiring data from at least one of the plurality of systems in relation to the requestor, wherein the data defines performed work tasks, compensation and eligible benefits to be monetized; and determining an acceptable amount by evaluating the acquired data according to a predictive model defined at the cloud platform service according to processing rules defined in relation to different properties of the data.

17. The system of claim 16, wherein the computer-readable storage device includes further instructions which when executed by the computing device, cause the computing device to perform operations comprising:

instantiating the cloud platform service at a cloud infrastructure environment, wherein the cloud platform service is configured to access the plurality of systems in relation to received requests from employees identified at employee records at the plurality of systems, wherein the employees are defined as objects at the plurality of systems and stored together with corresponding employee data portions of the employee data, and wherein the employee data comprises data related to the performed work tasks, the eligible benefits, employee identification data, and other employee profile data for the enterprise.

18. The system of claim 16, wherein the at least one of the plurality of systems comprises a first system that executes a first process in relation to tracking data for the employees of the enterprise in a discrete delayed manner at fixed iterations, and wherein the data from the first systems that is used to provide the real time estimation is acquired between two consecutive iterative executions of the first process, and wherein the data is non-current data for the first system, and where the predictive model is defined to determine a prediction of data changes in relation to the data from the first system to provide real time estimation based on the non-current data.

19. The system of claim 16, wherein the real time estimation includes computing a prediction value of a monetized amount corresponding to the performed work tasks, the compensation and the eligible benefits based on the processing rules, wherein the processing rules are defined to measure the properties of the data, and wherein the predictive model applies data evaluation based on measures of the properties in relation to predefined threshold values by the enterprise.

20. The system of claim 16, wherein the computer-readable storage device includes further instructions which when executed by the computing device, cause the computing device to perform operations comprising:

providing, by the platform service, an instruction to a financial service associated with the plurality of systems and the enterprise, to execute a transaction according to the determined acceptable amount for the requestor.

* * * * *